(12) United States Patent
Kusunoki (10) Patent No.: US 9,287,537 B2
(45) Date of Patent: Mar. 15, 2016

(54) ELECTRIC STORAGE APPARATUS INCLUDING PROTRUDING PORTION ATTACHED TO EXTERNAL HOUSING

(71) Applicant: Lithium Energy Japan, Kyoto-shi (JP)

(72) Inventor: Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 97 days.

(21) Appl. No.: 14/037,951

(22) Filed: Sep. 26, 2013

(65) Prior Publication Data

US 2014/0093763 A1 Apr. 3, 2014

(30) Foreign Application Priority Data

Sep. 28, 2012 (JP) ................. 2012-218357

(51) Int. Cl.
*H01M 2/10* (2006.01)
*H01G 11/10* (2013.01)
*H01G 11/78* (2013.01)
*H01G 2/10* (2006.01)
*H01M 10/052* (2010.01)

(52) U.S. Cl.
CPC ............. *H01M 2/1072* (2013.01); *H01G 11/10* (2013.01); *H01G 11/78* (2013.01); *H01G 2/10* (2013.01); *H01M 10/052* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

| | | | |
|---|---|---|---|
| 2010/0119928 A1* | 5/2010 | Yoon | 429/120 |
| 2010/0273040 A1 | 10/2010 | Kubota et al. | |
| 2011/0143179 A1* | 6/2011 | Nakamori | 429/99 |
| 2011/0151314 A1 | 6/2011 | Ogawa | |

FOREIGN PATENT DOCUMENTS

| | | |
|---|---|---|
| JP | H05-090808 U | 12/1993 |
| JP | H06-267519 A | 9/1994 |
| JP | 2001-057195 A | 2/2001 |
| JP | 2009-146881 A | 7/2009 |
| JP | 2009-217989 A | 9/2009 |
| JP | 2010-049808 A | 3/2010 |
| JP | 2011-34883 A | 2/2011 |
| JP | 2011-124101 A | 6/2011 |
| JP | 2012-101663 A | 5/2012 |
| WO | WO 2012-164730 A1 | 12/2012 |

* cited by examiner

*Primary Examiner* — Patrick Ryan
*Assistant Examiner* — Lucas J O'Donnell
(74) *Attorney, Agent, or Firm* — McGinn IP Law Group, PLLC (57) ABSTRACT

Provided is an electric storage apparatus including: a first external housing for holding at least one storage device that includes a first vertical wall portion for surrounding at least one electric storage device; and a second external housing including a second vertical wall portion for surrounding the first vertical wall portion and an open portion formed at an upper end. An outer surface of the first vertical wall portion is an inclined surface that is inclined to the second vertical wall portion, and one of an outer surface of the first vertical wall portion and an inner surface of the second vertical wall portion includes a protrusion portion that protrudes toward the other.

18 Claims, 6 Drawing Sheets

ELECTRIC STORAGE APPARATUS INCLUDING PROTRUDING PORTION ATTACHED TO EXTERNAL HOUSING

CROSS-REFERENCE TO RELATED APPLICATIONS

This application claims the benefit of Japanese Patent Application No. 2012-218357, which is incorporated herein by reference.

FIELD

The present invention relates to an electric storage apparatus adopted for a power supply of machines and equipments. More specifically, the present invention relates to an electric storage apparatus including an electric storage device and an external housing for housing the electric storage device.

BACKGROUND

Electric drive machines and equipments such as hybrid electric vehicles (HEVs), electric vehicles (EVs), electric motorcycles, aircraft, and marine vessels include various output apparatuses such as motors, electric lights and indicators. Accordingly, an electric storage apparatus for supplying electric power to the output apparatuses is mounted on each electric drive machine and equipment.

The electric storage apparatus includes at least one electric storage device and an external housing for housing the at least one electric storage device. As a result, the electric storage apparatus secures electrical insulating properties by means of the external housing, while supplying the electric power corresponding to the number of electric storage devices to the output apparatuses.

There is known an electric storage apparatus that includes a first external housing for housing an electric storage device and a second external housing for housing the first external housing (see, for example, Patent Literature 1). The first external housing is made smaller than the second external housing so as to be housed in the second external housing. Further, the second external housing includes an opening portion for inserting the first external housing.

The first external housing and the second external housing are kept at a given positional relationship, and form a double partition wall around the electric storage device. Accordingly, the electric storage apparatus of this type is excellent in durability (resistance to vibration), and the electric storage device can be reliably protected under a vibrational environment.

Meanwhile, in the electric storage apparatus of this type, because the first external housing is made smaller than the second external housing as described above, a gap exists between the first external housing and the second external housing in the state where the first external housing is housed in the second external housing. Accordingly, looseness or play of the first external housing may occur inside the second external housing. Consequently, unwanted vibrations may be applied to the electric storage device and the like included in the electric storage apparatus.

CITATION LIST

Patent Literature 1

Patent Literature 1: Japanese Patent Application Laid-Open No. 2012-101663

SUMMARY

The following presents a simplified summary of the invention disclosed herein in order to provide a basic understanding of some aspects of the invention. The summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage apparatus that enables easy insertion of a first external housing into a second external housing and can suppress looseness or play of the first external housing housed in the second external housing.

An electric storage apparatus according to an aspect of the present invention includes: at least one electric storage device; a first external housing for holding the at least one electric storage device, the first external housing including a first vertical wall portion for surrounding an outer periphery of the at least one electric storage device; and a second external housing for housing the first external housing, the second external housing including a second vertical wall portion for surrounding the first vertical wall portion and an open portion formed at an upper end of the second vertical wall portion for inserting the first external housing therein, wherein an outer surface of the first vertical wall portion is an inclined surface that is inclined so as to be more spaced apart from the second vertical wall portion toward a deeper side in an insertion direction of the first external housing, and one of the outer surface of the first vertical wall portion and an inner surface of the second vertical wall portion includes a protrusion portion that protrudes toward the other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An electric storage apparatus according to an aspect of the present invention includes: at least one electric storage device; a first external housing including a first vertical wall portion for surrounding an outer periphery of the at least one electric storage device, the first external housing being for holding the at least one electric storage device; and a second external housing including: a second vertical wall portion for surrounding the first vertical wall portion of the first external housing; and an open portion formed at an upper end of the second vertical wall portion, the first external housing being inserted and housed from the open portion. An outer surface of the first vertical wall portion is an inclined surface that is inclined so as to be more spaced apart from the second vertical wall portion toward a deeper side in an insertion direction of the first external housing, and any one of the outer surface of the first vertical wall portion and an inner surface of the second vertical wall portion includes a protrusion portion that protrudes toward any other one thereof.

According to the electric storage apparatus configured as described above, the outer surface of the first vertical wall portion of the first external housing is the inclined surface that is inclined with respect to the second vertical wall portion of the second external housing, and the inclined surface is inclined so as to be more spaced apart from the second vertical wall portion toward the deeper side in the insertion direction of the first external housing, whereby the first external housing can be easily inserted into the second external housing.

In addition, any one of the outer surface of the first vertical wall portion and the inner surface of the second vertical wall portion includes the protrusion portion that protrudes toward the other one thereof, whereby looseness or play of the first external housing housed in the second external housing is suppressed. That is, even if a gap exists between the first external housing and the second external housing, the protrusion portion suppresses the looseness or play.

Further, according to an aspect of the present invention, the protrusion portion may abut against the other one of the outer surface of the first vertical wall portion and the inner surface of the second vertical wall portion. Even if a gap exists between the first external housing and the second external housing, the protrusion portion provided on the outer surface of the first vertical wall portion abuts against the inner surface of the second vertical wall portion, or the protrusion portion provided on the inner surface of the second vertical wall portion abuts against the first vertical wall portion, whereby the first external housing inside the second external housing is restricted by the protrusion portion so as not to cause the looseness or play.

According to another aspect of the present invention, the protrusion portion may be a protruding ridge that is formed along the insertion direction of the first external housing so as to become higher toward the deeper side in the insertion direction thereof. According to such a configuration, because the protrusion portion is a protruding ridge formed along the insertion direction, that is, because the protrusion portion is formed so as to have a small width and a large length, when the first external housing is inserted into the second external housing, the protrusion portion does not rub against or come into frictional contact with the other one of the inner surface and the outer surface in a wide range, and thus does not cause high resistance force. Accordingly, the first external housing can be smoothly inserted into the second external housing.

According to still another aspect of the present invention, the protrusion portion may be formed on the outer surface of the first vertical wall portion. According to such a configuration, the rigidity of the first vertical wall portion of the first external housing can be further enhanced by the protrusion portion, that is, the protrusion portion can function like a reinforcement portion.

In this case, a plurality of the protrusion portions may be formed at appropriate intervals in a circumferential direction, on the outer surface of the first vertical wall portion. According to such a configuration, the plurality of protrusion portions that are formed at the appropriate intervals in the circumferential direction on the outer surface of the first vertical wall portion abut against the second vertical wall portion at a plurality of portions, whereby the looseness or play of the first external housing housed in the second external housing can be suppressed.

In this case, the electric storage apparatus may have a configuration in which: the first vertical wall portion has a rectangular shape and includes: a pair of first main wall portions corresponding to long sides of the rectangular shape, and a pair of first side wall portions corresponding to short sides of the rectangular shape; the second vertical wall portion has a rectangular shape and include a pair of second main wall portions corresponding to long sides of the rectangular shape, and a pair of second side wall portions corresponding to short sides of the rectangular shape; an outer surface of each of the pair of first main wall portions is the inclined surface; and the plurality of protrusion portions may be formed at appropriate intervals in a width direction, on the outer surface of each of the pair of first main wall portions. According to such a configuration, the area in which the first main wall portion and the second main wall portion are opposed to each other is larger than the area in which the first side wall portion and the second side wall portion are opposed to each other. The gap between the first main wall portion and the second main wall portion is restricted by the protrusion portions formed at the appropriate intervals, whereby the looseness or play of the first external housing housed in the second external housing can be suppressed.

As described above, the present invention can produce such excellent effects that the first external housing can be easily inserted into the second external housing and that the looseness or play of the first external housing housed in the second external housing can be suppressed.

Hereinafter, an electric storage apparatus according to an embodiment of the present invention is described with reference to the attached drawings.

Figure 1:
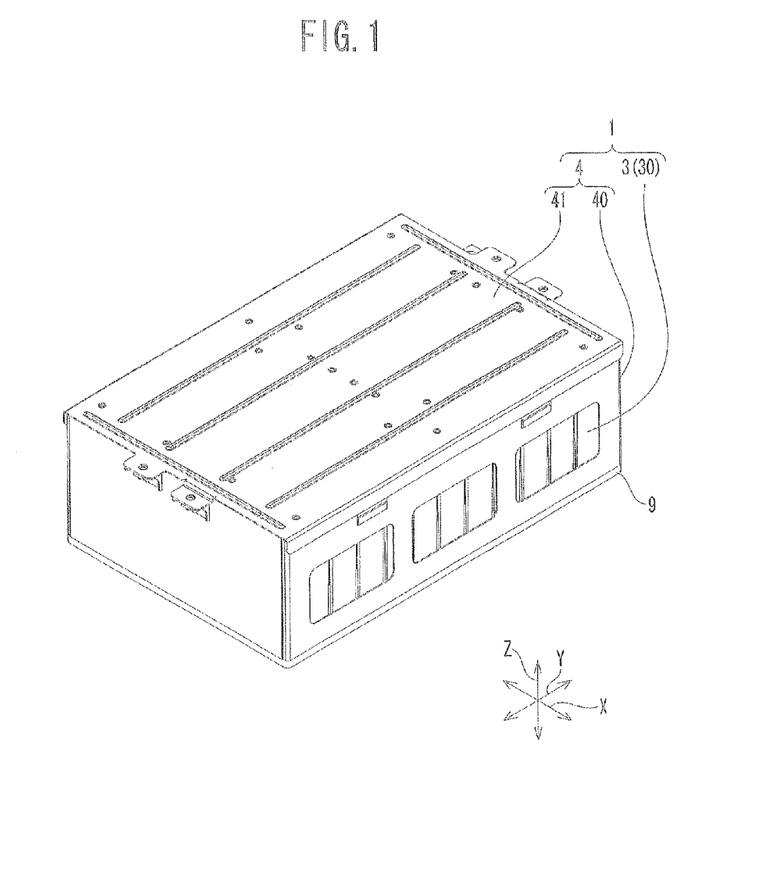
FIG. 1 is an overall perspective view of an electric storage apparatus (battery module) according to an embodiment of the present invention.
Figure 2:
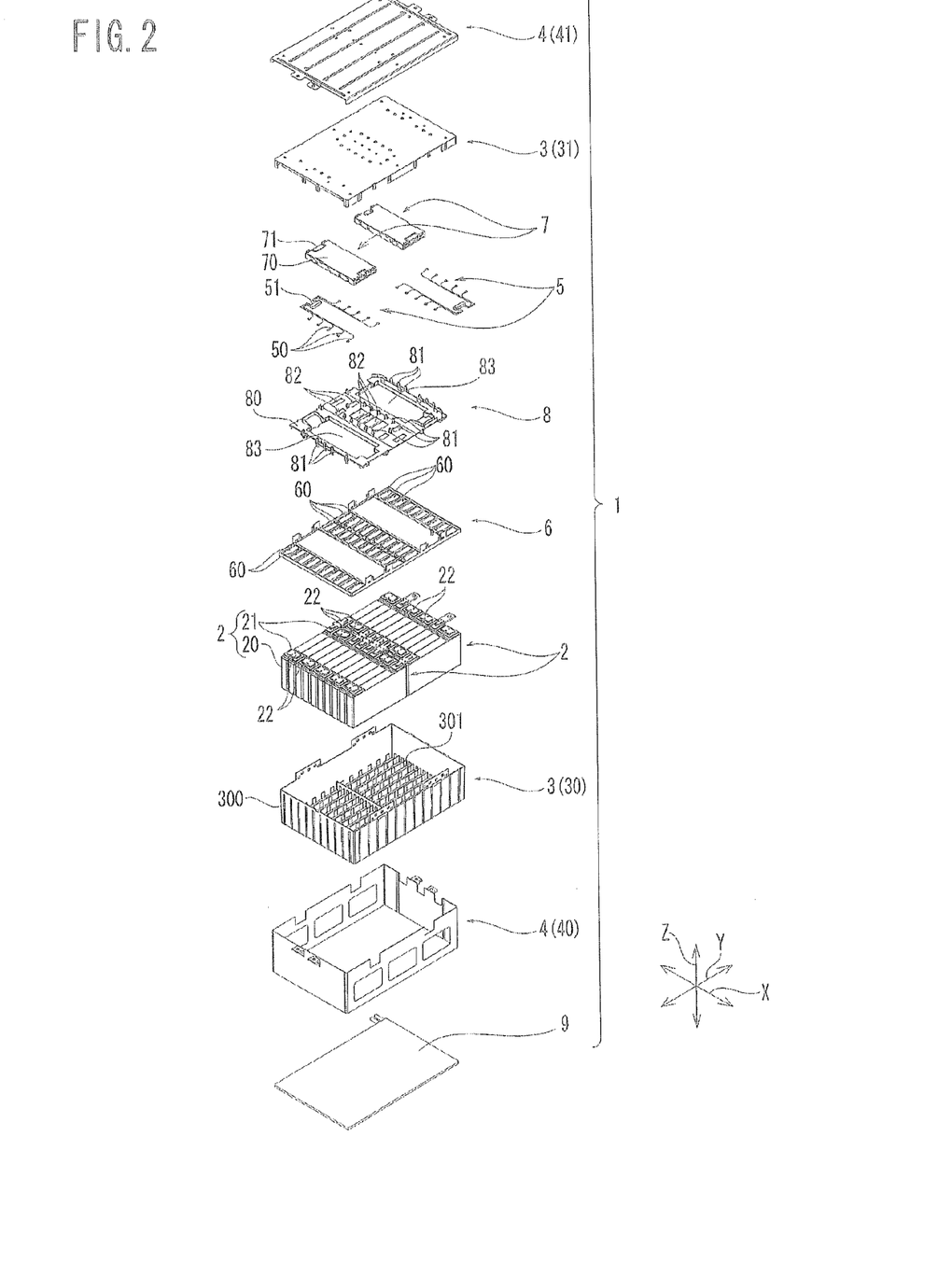
FIG. 2 is an exploded perspective view of the electric storage apparatus (battery module) according to the embodiment.

As illustrated in FIG. 1, the electric storage apparatus according to the present embodiment includes a first external housing 3 and a second external housing 4 for covering the first external housing 3. More specifically, as illustrated in FIG. 2, an electric storage apparatus 1 includes: at least one electric storage device 2; the first external housing 3 for housing the electric storage device 2; and the second external housing 4 for housing the first external housing 3.

In addition to the above-mentioned configuration, the electric storage apparatus 1 according to the present embodiment further includes: a signal line 5 connected to the electric storage device 2; a support member 6 placed on the electric storage device 2 housed in the first external housing 3; a monitoring apparatus 7 that is electrically connected to the electric storage device 2 through the signal line 5, the monitoring apparatus 7 being for electrically monitoring the electric storage device 2; and a frame member 8 for holding the signal line 5 placed between the monitoring apparatus 7 and the electric storage device 2. The electric storage apparatus 1 according to the present embodiment further includes a heat sink 9 for cooling the electric storage device 2.

A rechargeable secondary battery cell (in the present embodiment, a lithium-ion secondary battery cell) is adopted for the electric storage device 2. Note that, because the secondary battery cell is adopted for the electric storage device 2, the electric storage apparatus 1 is referred to as battery module, and the electric storage device 2 is referred to as battery cell, in the following description.

The battery cell 2 includes: a cell case 20 for housing an electrode assembly (not illustrated) including a positive electrode plate and a negative electrode plate; and external terminals 21, 21 placed outside of the cell case 20. In the present embodiment, the cell case 20 is formed in a hexahedral shape. That is, a prismatic cell is adopted for the battery cell 2. The battery cell 2 includes a positive electrode external terminal 21 and a negative electrode external terminal 21 as the external terminals 21, 21. The positive electrode external terminal 21 and the negative electrode external terminal 21 are placed on one of the six surfaces forming the outer surface of the cell case 20.

The battery module 1 according to the present embodiment includes a plurality of battery cells 2. The plurality of battery cells 2 are arrayed longitudinally and laterally. That is, the plurality of battery cells 2 are placed in a plurality of rows and columns (in ten rows and two columns in the battery module 1 illustrated in the drawings). Accordingly, the battery module 1 includes bus bars 22 for electrically connecting the battery cells 2, 2. Each bus bar 22 connects the positive electrode external terminal 21 and the negative electrode external terminal 21 of the adjacent battery cells 2. The bus bar 22 may be screwed to the external terminals 21, or may be welded to the external terminals 21. In the present embodiment, the bus bar 22 is welded to the external terminal 21. As a result, the plurality of battery cells 2 are electrically connected in series, to thereby form a large-capacity battery. Note that, in the following description, an opening on a second end side of a surrounding wall portion 300 (an opening thereof to which a bottom portion 301 is connected) to be described later may be referred to as first opening, and an opening on a first end side of the surrounding wall portion 300 may be referred to as second opening.

The first external housing 3 includes a partition wall opposed to each battery cell 2. The first external housing 3 according to the present embodiment is a resin container for housing at least one battery cell 2. That is, the first external housing 3 is a resin molded article, and defines a space for housing the plurality of battery cells 2.

Figure 3:
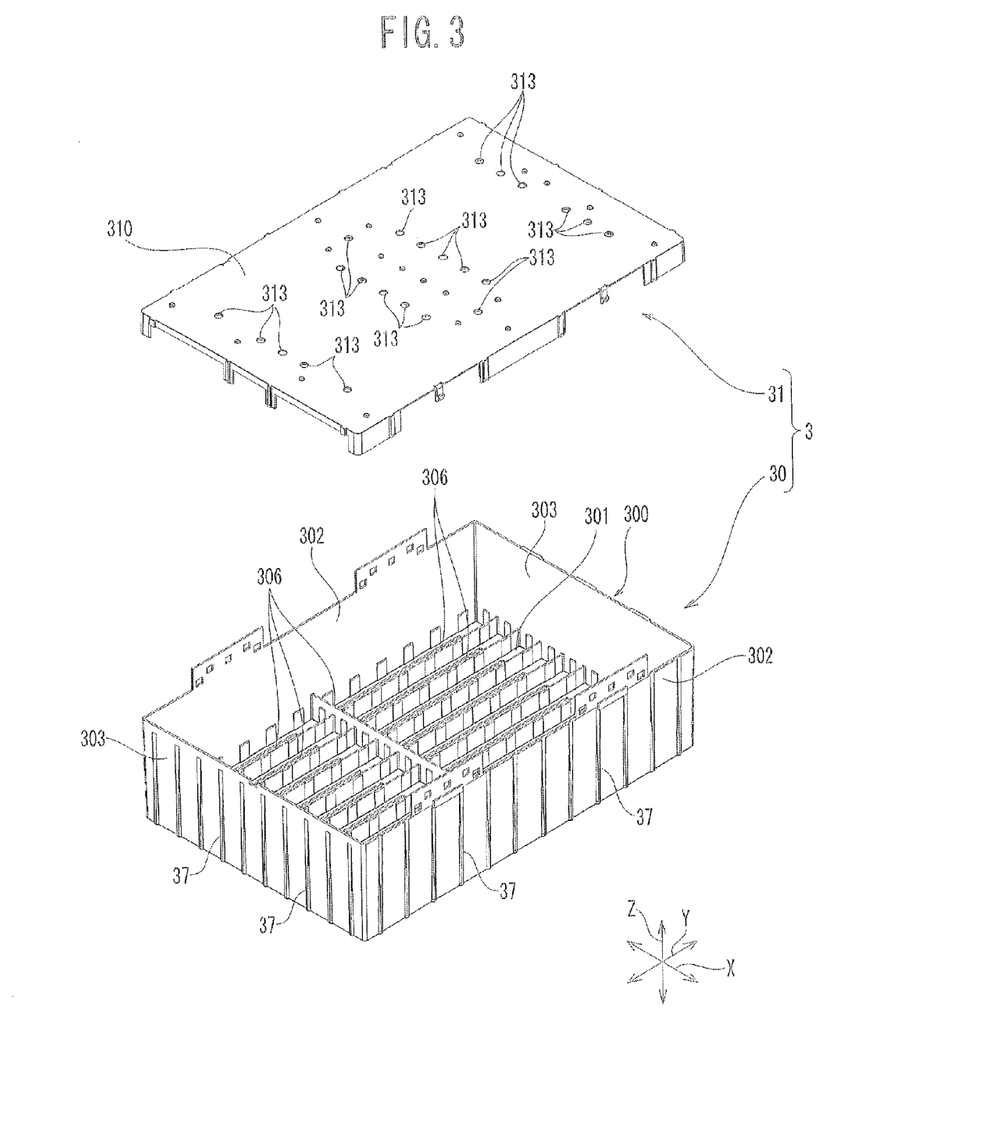
FIG. 3 is an exploded perspective view of a first external housing of the electric storage apparatus (battery module) according to the embodiment.

More specific description thereof is given. As illustrated in FIG. 3, the first external housing 3 includes a resin body 30 and a resin cover plate 31. The body 30 includes: the surrounding wall portion 300 having the first end and the second end in a first direction (a Z axis direction illustrated in the drawings), the surrounding wall portion 300 being opened at the first end and for collectively surrounding the plurality of battery cells 2; and the bottom portion 301 connected to the second end of the surrounding wall portion 300. The cover plate 31 includes a closing portion 310 for closing the opening of the surrounding wall portion 300.

A prismatic cell is adopted for each of the plurality of battery cells 2. The plurality of battery cells 2 are each placed in a matrix. Accordingly, the surrounding wall portion 300 of the body 30 is formed in a frame-like shape fitted to the matrix. That is, the surrounding wall portion 300 includes: a pair of first main wall portions 302, 302 that are opposed to each other with a space therebetween in a second direction (an X axis direction illustrated in the drawings) orthogonal to the first direction; and a pair of first side wall portions 303, 303 that are opposed to each other with a space therebetween in a third direction (a Y axis direction illustrated in the drawings) orthogonal to the first direction and the second direction. The respective first main wall portions 302, 302 and the respective first side wall portions 303, 303 are continuous with each other. As a result, the surrounding wall portion 300 is formed in a continuous rectangular shape.

Each of the first main wall portions 302, 302 and the first side wall portions 303, 303 is formed in a rectangular shape. In the present embodiment, the sizes of the respective first main wall portions 302, 302 and the respective first side wall portions 303, 303 in the first direction are set to be the same. In contrast, the size of each of the first main wall portions 302, 302 in the third direction is set to be longer than the size of each of the first side wall portions 303, 303 in the second direction. As a result, the surrounding wall portion 300 has a rectangular opening whose long sides are formed from the respective first main wall portions 302, 302 and short sides are formed from the respective first side wall portions 303, 303.

The first main wall portions 302, 302 and the first side wall portions 303, 303 of the first external housing 3 according to the present embodiment are configured as inclined surfaces. More specifically, in order to insert and house the first external housing 3 from an open portion formed at the upper end of the second external housing 4 (from a first opening of the second external housing 4 to be described later), the outer surfaces of the first main wall portions 302, 302 and the first side wall portions 303, 303 of the first external housing 3 are configured as the inclined surfaces that are inclined so as to be more spaced apart from second main wall portions 400, 400 and second side wall portions 401, 401 (to be described later in detail) of the second external housing 4, toward the deeper side in the insertion direction (toward bottom portion 301 side) of the first external housing 3. Note that the upper ends on the second opening side of the first main wall portions 302, 302 and the first side wall portions 303, 303 are in contact with the vicinity of the upper end on the first opening side of the second external housing 4.

Accordingly, the first external housing 3 is larger on the second opening side than on the first opening side. Further, the first main wall portions 302, 302 and the first side wall portions 303, 303 have a substantially uniform plate thickness. Accordingly, the gap between: the cell case 20 of the battery cell 2 housed in the first external housing 3; and the first main wall portions 302, 302 and the first side wall portions 303, 303 becomes larger toward the second opening side. Further, the second opening of the surrounding wall portion 300 is substantially the same in height as the external terminals 21 of the battery cell 2 housed in the first external housing 3. More specifically, the heights of the first main wall portions 302, 302 and the first side wall portions 303, 303 in the first direction are set such that the leading end surfaces of the external terminals 21 of the battery cell 2 slightly protrude from the second opening of the first external housing 3.

Then, in the present embodiment, the outer surfaces of the first main wall portions 302, 302 of the first external housing 3 are provided with protrusion portions 37 that abut against the inner surfaces of the second main wall portions 400, 400 of the second external housing 4. Similarly, the outer surfaces of the first side wall portions 303, 303 of the first external housing 3 are provided with protrusion portions 37 that abut against the inner surfaces of the second side wall portions 401, 401 of the second external housing 4. More specifically, a plurality of the protrusion portions 307 are formed at appropriate intervals in the circumferential direction of the first main wall portions 302, 302 and the first side wall portions 303, 303.

Then, because the first main wall portions 302, 302 and the first side wall portions 303, 303 are configured as the inclined surfaces, the protrusion portions 307 are formed as protruding ridges over the entire length from the first opening to the second opening along the insertion direction (first direction) so as to become higher toward the deeper side in the insertion direction (toward the first opening side) of the first external housing 3. As a result, the protrusion portions 307 function as ribs. In the case where the upper ends on the second opening side of the first main wall portions 302, 302 and the first side wall portions 303, 303 are in contact with the vicinity of the upper end on the first opening side of the second external housing 4 as described above, the protrusion portions 307 do not protrude in this contact portion, and protrude so as to become gradually higher toward the first opening side.

The inner surface of the bottom portion 301 is provided with positioning ribs 306 for such positioning that the plurality of battery cells 2 are placed in the matrix. As a result, the plurality of battery cells 2 are placed in the matrix in plan view, in the state where each one of a pair of the external terminals 21, 21 of each battery cell 2 faces the cover plate 31.

As described above, the cover plate 31 includes the closing portion 310, and can be coupled to the body 30 in the state where the opening of the body 30 is closed thereby. The planar shape of the closing portion 310 is set so as to conform to the shape of the second opening of the surrounding wall portion 300. In the present embodiment, the surrounding wall portion 300 is formed in a frame-like shape (has the rectangular opening), and hence the closing portion 310 is formed in a rectangular shape in plan view.

The closing portion 310 includes through-holes 313. The through-holes 313 are respectively placed at positions corresponding to supporting posts 81 (to be described later; see FIG. 2) of the frame member 8. In the present embodiment, the frame member 8 is provided with a plurality of the supporting posts 81. Accordingly, the closing portion 310 includes a plurality of the through-holes 313. The diameter of each of the plurality of through-holes 313 is set to be larger than the outer diameter of the corresponding supporting post 81. That is, the through-hole 313 is formed so as to be insertable (pass completely through) the supporting post 81.

Figure 4:
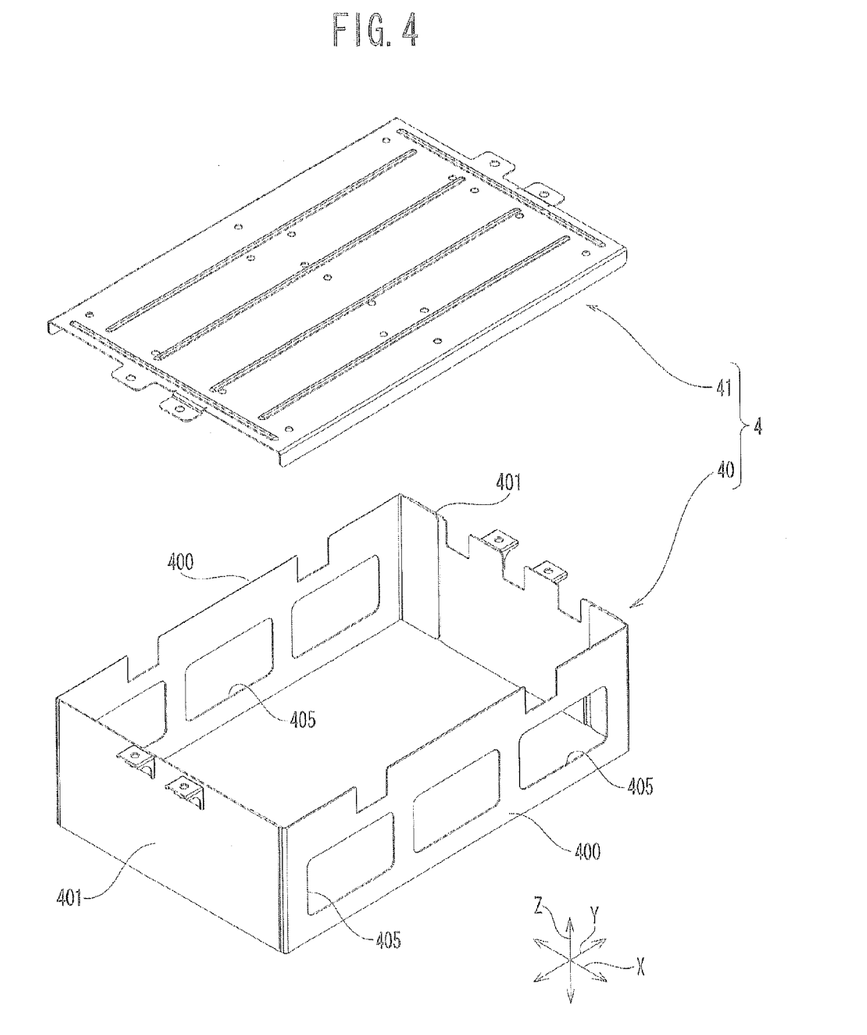
FIG. 4 is an exploded perspective view of a second external housing of the electric storage apparatus (battery module) according to the embodiment.

The second external housing 4 according to the present embodiment is a metal container for housing the first external housing 3. That is, the second external housing 4 defines a space for housing the first external housing 3. More specific description thereof is given. As illustrated in FIG. 4, the second external housing 4 includes a metal framework 40 and a metal cover 41. The framework 40 serves as the second vertical wall portion that forms the first opening and a second opening at both ends in the first direction (the Z axis direction illustrated in the drawings), and surrounds the first external housing 3. The cover 41 closes the first opening of the framework 40.

The framework 40 has a first end (upper end) that defines the first opening in the first direction and a second end (lower end) that defines the second opening in the first direction. The framework 40 is obtained by processing a metal plate, and is formed so as to conform to the outer peripheral shape of the surrounding wall portion 300 of the first external housing 3. In the present embodiment, the surrounding wall portion 300 is formed in the continuous rectangular shape, and the framework 40 is also formed in a continuous rectangular shape accordingly. That is, the framework 40 includes: a pair of the second main wall portions 400, 400 that are opposed to each other with a space therebetween in the second direction (the X axis direction illustrated in the drawings); and a pair of the second side wall portions 401, 401 that are opposed to each other with a space therebetween in the third direction (the Y axis direction illustrated in the drawings).

The pair of second main wall portions 400, 400 and the pair of second side wall portions 401, 401 are each formed in a plate-like shape. The inner surfaces of the pair of second main wall portions 400, 400 and the inner surfaces of the pair of second side wall portions 401, 401 are parallel or substantially parallel to a central line (not illustrated; a central line that extends in the first direction) of the first opening and the second opening. That is, the inner surface of one of the second main wall portions 400 is parallel or substantially parallel to the inner surface of the other of the second main wall portions 400, and the inner surface of one of the second side wall portions 401 is parallel or substantially parallel to the inner surface of the other of the second side wall portions 401. Accordingly, the sizes of the first opening and the second opening of the framework 40 are the same or substantially the same as each other.

Each of the second main wall portions 400, 400 and the second side wall portions 401, 401 is formed in a rectangular shape. In the present embodiment, the sizes (maximum sizes) of the respective second main wall portions 400, 400 and the respective second side wall portions 401, 401 in the first direction are set to be the same. In contrast, the size of each of the second main wall portions 400, 400 in the third direction is set to be longer than the size of each of the second side wall portions 401, 401 in the second direction. As a result, the framework 40 has rectangular openings (the first opening and the second opening) whose long sides are formed from the respective second main wall portions 400, 400 and short sides are formed from the respective second side wall portions 401, 401.

Accordingly, the second main wall portions 400, 400 are larger in size than the second side wall portions 401, 401. Hence, for a reduction in weight, a plurality of (in the drawings, three) window hole portions 405, 405 are opened in each of the second main wall portions 400, 400.

In the present embodiment, the size of the framework 40 is set such that the framework 40 abuts against the protrusion portions 307 of the surrounding wall portion 300 of the first external housing 3. That is, the size of the framework 40 is determined such that the protrusion portions 307, 307 formed in the pair of first main wall portions 302, 302 respectively abut against the inner surfaces of the pair of second main wall portions 400, 400, while the protrusion portions 307, 307 formed in the pair of first side wall portions 303, 303 respectively abut against the inner surfaces of the pair of second side wall portions 401, 401. Note that, in the present embodiment, the framework 40 is larger in size in the first direction than the surrounding wall portion 300 of the first external housing 3.

The cover 41 is obtained by press-forming a metal plate, and can be coupled to the framework 40 in the state where the first opening of the framework 40 is closed thereby. More specifically, edges of the cover 41 are formed in a frame-like shape, and these edges are fitted to the first opening of the framework 40 from the outside.

Returning to FIG. 2, the support member 6 is formed so as to be placeable on the plurality of battery cells 2 inside the first external housing 3 (surrounding wall portion 300). More specifically, in order to place the support member 6 inside the second opening of the surrounding wall portion 300, the support member 6 is formed so as to conform to the inner peripheral shape of the surrounding wall portion 300. Further, the support member 6 is supported by (coupled to) the surrounding wall portion 300 so as to be located above the plurality of battery cells 2.

The support member 6 is provided with first exposure portions 60 for exposing the respective external terminals 21, 21 of the battery cells 2 and the bus bars 22. In the present embodiment, because the bus bars 22 are placed in a plurality of portions as described above, the support member 6 is provided with the first exposure portions 60 at positions corresponding to the plurality of bus bars 22, respectively. More specifically, in the battery module 1 according to the present embodiment, because the plurality of battery cells 2 are placed in ten rows and two columns, the plurality of bus bars 22 are placed in a plurality of columns (three columns) with a space therebetween in the third direction. Accordingly, the plurality of first exposure portions 60 arrayed in the second direction are provided in both end parts and a central part of the support member 6 in the third direction.

The monitoring apparatus 7 includes a control substrate for performing electronic control and a substrate case 70 for covering the control substrate. The control substrate includes, mounted thereon, a connector 71 for connecting a CPU, a memory, and the signal line 5 (harness). The substrate case 70 surrounds the entire control substrate with the connector 71 being exposed.

The frame member 8 defines a wiring route for the signal line 5. More specific description thereof is given. The frame member 8 includes: a base 80 for defining the wiring route for the signal line 5; and the supporting posts 81 that are provided so as to intersect with the base 80 in the first direction.

The base 80 is formed so as to be placeable on the support member 6 placed inside the first external housing 3. The base 80 is provided with second exposure portions 82 for exposing the respective external terminals 21, 21 of the battery cells 2 and the bus bars 22 through the first exposure portions 60 of the support member 6.

More specific description thereof is given. The base 80 is formed in a rectangular shape in plan view. The size of the base 80 according to the present embodiment in the second direction corresponds to the size of the support member 6 in the second direction. In contrast, the size of the base 80 in the third direction is set to be shorter than the size of the support member 6 in the third direction. That is, the base 80 is placeable on the support member 6 so as not to overlap with the plurality of first exposure portions 60 that are provided in both the end parts of the support member 6 in the third direction. Consequently, the base 80 according to the present embodiment is provided with the plurality of second exposure portions 82 at positions corresponding to the plurality of first exposure portions 60 arrayed in the central part of the support member 6 in the third direction, respectively.

The base 80 has a first surface and a second surface opposite to the first surface in the first direction. The wiring route for the signal line 5 is set on the base 80. Then, control apparatus placement regions 83 for placing the monitoring apparatus 7 are set on the second surface of the base 80. The start point of the wiring route is set on the basis of each control apparatus placement region 83 (the connector 71 of the monitoring apparatus 7 placed in each control apparatus placement region 83).

In the present embodiment, the signal line 5 (harness) is an aggregation of a plurality of lead wires 50, and includes a connector 51 to which the start ends of the plurality of lead wires 50 are connected, the connector 51 being connected to the connector 71 of the monitoring apparatus 7. Each of the plurality of lead wires 50 (signal line 5) runs out of the route in accordance with the placement of the corresponding bus bar 22 (the bus bar 22 that is exposed in the first exposure portion 60 or the bus bar 22 that is exposed in the second exposure portion 82 through the first exposure portion 60) to be connected to the corresponding bus bar 22. In the present embodiment, the control apparatus placement regions 83 are set in two portions with a space therebetween in the third direction. Accordingly, wiring routes respectively corresponding to the two control apparatus placement regions 83, 83 are set on the base 80.

The supporting posts 81 extend in the first direction so as to intersect with the base 80. In the present embodiment, the through-holes 313 are provided in a plurality of portions. Accordingly, the plurality of supporting posts 81 are provided so as to respectively correspond to the positions of the through-holes 313. Each supporting post 81 is formed so as to abut against the support member 6 on the first surface side of the base 80 and so as to be inserted through the corresponding through-hole 313 of the cover plate 31 to protrude outward on the second surface side of the base 80. As a result, in the state where the cover 41 closes the first opening of the framework 40, the supporting post 81 is sandwiched between the cover 41 and the support member 6.

The heat sink 9 is placed so as to be opposed to the first external housing 3. The heat sink 9 may be of air cooling type including a heat radiating fin for increase in surface area, and may be of water cooling type in which cooling water is circulated inside. In the present embodiment, the water cooling type is adopted for the heat sink 9.

In the present embodiment, the framework 40 has the second opening, and the heat sink 9 is placed so as to close the second opening of the framework 40. That is, the heat sink 9 is formed in a plate-like shape that enables the second opening of the framework 40 to be closed. As a result, in the state where the heat sink 9 closes the second opening of the framework 40, the heat sink 9 is opposed to the first external housing 3 (bottom portion 301), and absorbs heat from the battery cell 2 housed in the first external housing 3. Note that the heat sink 9 is in contact with the first external housing 3 (the bottom portion 301 of the body 30), in order to enhance the heat radiation properties (cooling properties) for the battery cell 2.

Figure 5:
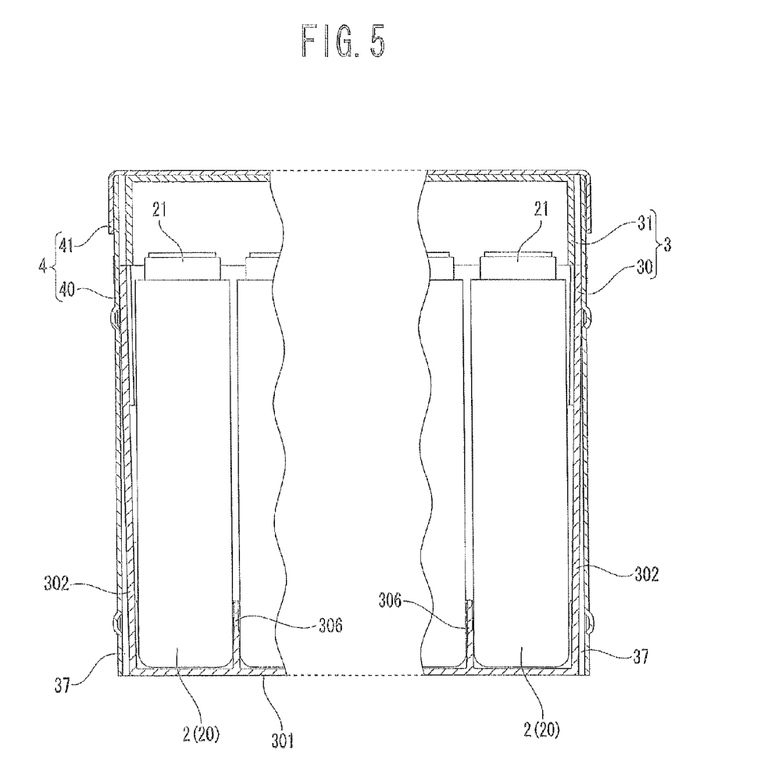
FIG. 5 is a partial enlarged sectional view of the electric storage apparatus (battery module) according to the embodiment, which is taken at a position at which a protrusion portion is not formed.
Figure 6:
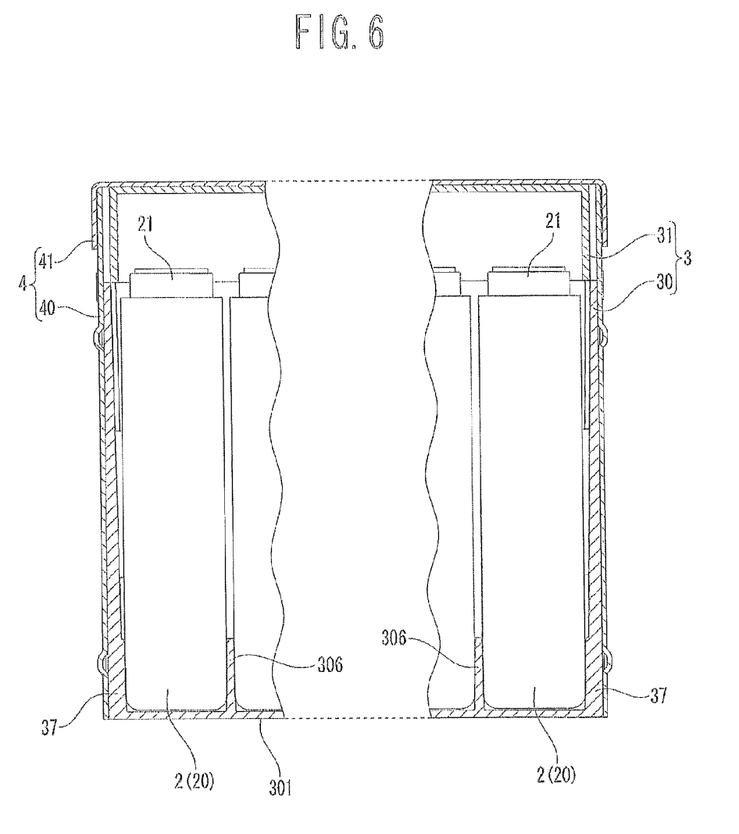
FIG. 6 is a partial enlarged sectional view of the electric storage apparatus (battery module) according to the embodiment, which is taken at a position at which the protrusion portion is formed.

The battery module 1 according to the present embodiment is, configured as described above. According to the battery module 1 thus configured, the first external housing 3 is housed in the second external housing 4 as illustrated in FIG. 5 and FIG. 6. The surrounding wall portion 300 (the first main wall portions 302 and the first side wall portions 303) of the first external housing 3 is configured as the inclined surfaces, and the deeper side in the insertion direction (bottom portion 301 side) of the first external housing 3 is made slightly smaller than the first opening of the second external housing 4. Hence, the first external housing 3 is easily inserted into the second external housing 4. Note that the gap between: the surrounding wall portion 300 (the first main wall portions 302 and the first side wall portions 303) of the first external housing 3; and the framework 40 (the second main wall portions 400 and the second side wall portions 401) of the second external housing 4 becomes larger toward the deeper side in the insertion direction (toward the bottom portion 301 side of the first external housing 3).

However, the protrusion portions 307 formed on the outer surface of the first external housing 3 abut against the inner surface of the framework 40 of the second external housing 4, whereby the first external housing 3 is restricted or locked (or prevented from being freely moved) inside the second external housing 4. Accordingly, looseness or play of the first external housing 3 housed in the second external housing 4 is suppressed.

The plurality of protrusion portions 37 are formed not on the entire surfaces of the first main wall portions 302 and the first side wall portions 303 but at appropriate intervals in the circumferential direction. Accordingly, when the first external housing 3 is inserted into the second external housing 4, the protrusion portions 37 do not rub against or come into frictional contact with the inner surface of the framework 40 of the second external housing 4 in a wide range, and hence the protrusion portions 37 do not cause high resistance force. Further, the protrusion portions 37 are formed over the entire length in the first direction. Hence, even if the window hole portions 405 are opened in the second main wall portions 400, the protrusion portions 37 abut against areas of the second main wall portions 400 on the first opening side and the second opening side of the window hole portions 405. The protrusion portions 37 abut over the entire lengths of areas of the second main wall portions 400 in which the window hole portions 405 are not opened.

Accordingly, undesirable vibrations can be prevented from being applied to: the electric storage device 2 housed in the first external housing 3; and the monitoring apparatus 7 that is placed above the electric storage device 2 with the intermediation of the support member 6 and is electrically connected to the electric storage device 2.

Further, in the present embodiment, the first external housing 3 comprises resin, and the second external housing 4 comprises metal. Hence, the first external housing 3 protects the battery cell 2 while securing electrical insulating properties for the battery cell 2. Further, the second external housing 4 protects the first external housing 3 and the battery cell 2 housed therein while enhancing the overall strength (rigidity). Accordingly, the battery module 1 according to the present embodiment is excellent in safety aspect and strength aspect.

In particular, in the present embodiment, the second external housing 4 includes the framework 40 for surrounding the first external housing 3, and hence the first external housing 3 and the framework 40 of the second external housing 4 that surrounds the first external housing 3 together form a double partition wall. As a result, the rigidity around the first external housing 3 can be reliably enhanced. Note that the framework 40 of the second external housing 4 protrudes higher than the surrounding wall portion 300 of the first external housing 3. Accordingly, the end part on the first opening side of the framework 40 of the second external housing 4 surrounds the cover plate 31 of the first external housing 3.

Moreover, the surrounding wall portion 300 of the first external housing 3 is configured as the inclined surfaces, and hence the resin first external housing 3, which is molded in a die, has a draft angle. The protrusion portions 37 formed in the first external housing 3 are protruding ridges with a space therebetween, and thus do not hinder a function of the draft angle during the resin molding.

Further, in the present embodiment, the heat sink 9 is placed so as to be opposed to the first external housing 3. Hence, even if the battery cell 2 housed in the first external housing 3 generates heat due to its charge and discharge, the heat is absorbed or radiated by the heat sink 9. Accordingly, even if the battery cell 2 is repeatedly charged and discharged (even if the battery cell 2 generates heat), damage to the battery cell 2 caused by an influence of the heat can be suppressed.

Note that the present invention is not limited to the above-mentioned embodiment, and may be modified as appropriate within a range not departing from the spirit and scope of the present invention, as a matter of course.

In the above-mentioned embodiment, the first external housing 3 (the body 30 and the cover plate 31) comprises resin, and the second external housing 4 (the framework 40 and the cover 41) comprises metal, but the present invention is not limited thereto. For example, the entirety or a part of the first external housing 3 (the body 30 and the cover plate 31) may comprise metal. In this case, it is a matter of course that, in order to secure electrical insulating properties for the battery cell 2 housed in the first external housing 3, a sheet having electrical insulating properties may be attached to the inner surface of the first external housing 3, or an electrical insulating layer (for example, coating) having electrical insulating properties may be provided on the inner surface of the first external housing 3. Alternatively, the second external housing 4 (the framework 40 and the cover 41) may comprise resin instead.

In the above-mentioned embodiment, the protrusion portions 37 are formed in the first main wall portions 302, 302 and the first side wall portions 303, 303 of the first external housing 3, but the present invention is not limited thereto. For example, the protrusion portions 37 may be formed in the second main wall portions 400, 400 and the second side wall portions 401, 401 of the second external housing 4. In particular, in the case where the second external housing 4 comprises resin, the protrusion portions 37 can be easily formed in the second external housing 4. Even if the second external housing 4 comprises metal, however, the protrusion portions 37 can be formed therein.

In the above-mentioned embodiment, the upper ends on the second opening side of the first main wall portions 302, 302 and the first side wall portions 303, 303 are in contact with the vicinity of the upper end on the first opening side of the second external housing 4, but the present invention is not limited thereto. For example, a gap may be provided between: the upper ends on the second opening side of the first main wall portions 302, 302 and the first side wall portions 303, 303; and the vicinity of the upper end on the first opening side of the second external housing 4. In this case, the height of the protrusion portions 37 is set to be the same as the height of this gap.

In the above-mentioned embodiment, the protrusion portions 37 are protruding ridges like ribs that are formed over the entire length from the first opening to the second opening along the insertion direction, but the present invention is not limited thereto. For example, the protrusion portions 37 may be not straight but meandering or waved. In short, it is sufficient that the protrusion portions 37 be formed so as to be coincident with the insertion direction of the first external housing 3.

In the above-mentioned embodiment, the protrusion portions 37 are formed in the first main wall portions 302, 302 and the first side wall portions 303, 303, but the present invention is not limited thereto. For example, the protrusion portions 37 may be formed in the first main wall portions 302, 302 or the first side wall portions 303, 303. Moreover, the protrusion portions 37 may be each formed as, for example, two protruding ridges that are arranged in tandem along the insertion direction, in other words, may be formed so as to be separated from each other and located on the first opening side and the second opening side of the first main wall portions 302, 302 and the first side wall portions 303, 303, respectively.

In the above-mentioned embodiment, the heat sink 9 is provided, but the heat sink 9 may be provided as needed. In the case where the heat sink 9 is not provided, a bottom plate for mounting the first external housing 3 may be separately provided.

In the above-mentioned embodiment, the plurality of battery cells 2 are provided, but the present invention is not limited thereto. For example, only a single battery cell may be provided instead of a plurality of the battery cells 2. That is, the number of the battery cells 2 may be set as appropriate such that required electric power can be supplied.

In the above-mentioned embodiment, the rechargeable secondary battery cell (lithium-ion secondary battery cell) is adopted for the electric storage device 2, but the present invention is not limited thereto. For example, a primary battery cell may be adopted for the electric storage device 2. Further, the electric storage device 2 is not limited to a battery cell, but may be a capacitor.

In the above-mentioned embodiment, the device (prismatic cell) including the hexahedral (cuboid in appearance) cell case 20 is adopted for the electric storage device 2, but the present invention is not limited thereto. For example, a device including a cell case 20 having a columnar shape may be adopted for the electric storage device 2.

What is claimed is:

1. An electric storage apparatus comprising:
   at least one electric storage device;
   a first external housing for holding the at least one electric storage device, the first external housing including a first vertical wall portion for surrounding an outer periphery of the at least one electric storage device; and
   a second external housing for housing the first external housing, the second external housing including a second vertical wall portion for surrounding the first vertical wall portion and an open portion formed at an upper end of the second vertical wall portion for inserting the first external housing therein,
   wherein the first vertical wall portion includes a flat outer surface,
   wherein the second vertical wall portion includes a flat inner surface,
   wherein the flat outer surface includes an inclined surface that is inclined so as to be more spaced apart from the second vertical wall portion toward a deeper side in an insertion direction of the first external housing,
   wherein one of the flat outer surface and the flat inner surface includes a protrusion portion that protrudes toward another one of the flat outer surface and the flat inner surface, and
   wherein the protrusion portion comprises a protruding ridge that is formed along the insertion direction of the first external housing so as to become thicker toward the deeper side in the insertion direction, and the protrusion portion abuts, over an entire length of the protrusion portion, against said another one of the flat outer surface and the flat inner surface.

2. The electric storage apparatus according to claim 1, wherein the protrusion portion is formed on the flat outer surface.

3. The electric storage apparatus according to claim 2, wherein the protrusion portion comprises a plurality of the protrusion portions formed at appropriate intervals in a circumferential direction, on the flat outer surface.

4. The electric storage apparatus according to claim 2, wherein the first vertical wall portion has a rectangular shape and includes a pair of first main wall portions corresponding to long sides of the rectangular shape, and a pair of first side wall portions corresponding to short sides of the rectangular shape,
   wherein the second vertical wall portion has a rectangular shape and includes a pair of second main wall portions corresponding to long sides of the rectangular shape of the second vertical wall portion, and a pair of second side wall portions corresponding to short sides of the rectangular shape of the second vertical wall portion,
   wherein an outer surface of each of the pair of first main wall portions includes the inclined surface, and
   wherein the plurality of protrusion portions are formed at appropriate intervals in a width direction, on the outer surface of each of the pair of first main wall portions.

5. The electric storage apparatus according to claim 2, wherein the second vertical wall portion includes a window hole portion, and
   wherein the protrusion portion abuts, over the entire length of the protrusion portion, against the flat inner surface of the second vertical wall portion in which the window hole portion is not opened.

6. The electric storage apparatus according to claim 1, wherein the first external housing comprises a resin container.

7. The electric storage apparatus according to claim 1, wherein the second external housing comprises a metal container.

8. The electric storage apparatus according to claim 1, wherein the second vertical wall portion includes a window hole portion, and
   wherein the protrusion portion abuts, over the entire length of the protrusion portion, against the flat inner surface of the second vertical wall portion in which the window hole portion is not opened.

9. The electric storage apparatus according to claim 1, wherein the second vertical wall portion includes a window hole portion, and
   wherein the protrusion portion abuts an entire area of the second vertical wall portion in which the window hole portion is not opened.

10. The electric storage apparatus according to claim 1, wherein, in the insertion direction of the first external housing, the protruding portion abuts against said one of the flat outer surface and the flat inner surface.

11. The electric storage apparatus according to claim 1, wherein the protruding portion abuts against said another one of the flat outer surface and the flat inner surface in the insertion direction of the first external housing.

12. An electric storage apparatus comprising:
    at least one electric storage device;
    a first external housing for holding the at least one electric storage device, the first external housing including a flat outer surface for surrounding an outer periphery of the at least one electric storage device; and
    a second external housing for housing the first external housing, the second external housing including a flat inner surface for surrounding the flat outer surface,
    wherein the flat outer surface includes an inclined surface that is inclined with respect to the flat inner surface such that the flat outer surface is more spaced apart from the flat inner surface toward a deeper side in an insertion direction of the first external housing,
    wherein one of the flat outer surface and the flat inner surface includes a protrusion portion that protrudes toward another one of the flat outer surface and the flat inner surface, and
    wherein the protrusion portion comprises a protruding ridge that is formed along the insertion direction of the first external housing so as to become thicker toward the deeper side in the insertion direction, and
    wherein, over an entire length of the protrusion portion, the protrusion portion abuts against said another one of the flat outer surface and the flat inner surface.

13. The electric storage apparatus according to claim 12, wherein the flat inner surface includes a window hole portion, and wherein the protrusion portion abuts, over the entire length of the protrusion portion, against the flat inner surface in which the window hole portion is not opened.

14. The electric storage apparatus according to claim 12, wherein the flat inner surface includes a window hole portion, and
wherein the protrusion portion abuts an entire area of the flat inner surface in which the window hole portion is not opened.

15. The electric storage apparatus according to claim 12, wherein, in the insertion direction of the first external housing, the protruding portion abuts against said one of the flat outer surface and the flat inner surface.

16. The electric storage apparatus according to claim 12, wherein the protruding portion abuts against said another one of the flat outer surface and the flat inner surface in the insertion direction of the first external housing.

17. The electric storage apparatus according to claim 12, wherein the protrusion portion is formed on the flat outer surface.

18. The electric storage apparatus according to claim 17, wherein the flat inner surface includes a window hole portion, and
wherein the protrusion portion abuts, over the entire length of the protrusion portion, against the flat inner surface in which the window hole portion is not opened.

\* \* \* \* \*